US006662925B2

(12) United States Patent
Franci

(10) Patent No.: US 6,662,925 B2
(45) Date of Patent: Dec. 16, 2003

(54) AUTOMATIC SELECTIVE SORTING DEVICE

(75) Inventor: François-Marie Franci, Ormoy (FR)

(73) Assignee: Internova International Innovation Company B.V., Rotterdam (NL)

( * ) Notice: Subject to any disclaimer, the term of this patent is extended or adjusted under 35 U.S.C. 154(b) by 0 days.

(21) Appl. No.: 10/239,934

(22) PCT Filed: Mar. 28, 2001

(86) PCT No.: PCT/IB01/00510

§ 371 (c)(1), (2), (4) Date: Sep. 26, 2002

(87) PCT Pub. No.: WO01/72437

PCT Pub. Date: Oct. 4, 2001

(65) Prior Publication Data

US 2003/0052049 A1 Mar. 20, 2003

(30) Foreign Application Priority Data

Mar. 28, 2000 (FR) ........................................... 00 03876

(51) Int. Cl.[7] ............................................... B65G 47/10
(52) U.S. Cl. .................................. 198/370.05; 209/698
(58) Field of Search ....................... 198/370.01, 370.05; 209/698, 934, 912, 933

(56) References Cited

U.S. PATENT DOCUMENTS 2,854,126 A * 9/1958 Rosenberger, Jr. ...... 198/370.05
3,357,539 A * 12/1967 Naslund ................ 198/370.05
3,581,891 A * 6/1971 Rysti ...................... 198/370.05
3,589,498 A * 6/1971 Cowan et al. .............. 198/352
4,318,807 A 3/1982 Maki-Hoimela et al.
4,805,780 A 2/1989 Solund
5,147,048 A * 9/1992 Signoretto .................. 209/698
5,307,921 A 5/1994 Richardson
5,462,268 A 10/1995 Remy et al.

FOREIGN PATENT DOCUMENTS

JP 59-036020 A 2/1984

OTHER PUBLICATIONS

Patent Abstracts of Japan: Vo. 008, No. 136 (M–304), Jun. 23, 1984 (To Follow).

* cited by examiner

*Primary Examiner*—James R. Bidwell
(74) *Attorney, Agent, or Firm*—Davis & Bujold, PLLC

(57) ABSTRACT

The invention concerns an automatic selective sorting device (10), for simultaneously loading, transporting and placing objects having very different characteristics in receiving containers, comprising a frame (11) bearing two toothed wheels (12, 13) arranged at each end of the frame (11), and whereon is stretched an endless conveyor (15). The loading mechanism consist of a line of conveyor belts (32) made up of a belt for manual insertion (32*a*) two accelerating belts (32*b*) and a belt for automatic insertion (32*c*). The acceleration belts (32*b*) are arranged respectively beneath two columns of a buffer storage and untiering system (33) which bring the objects to be sorted (8) and set them onto the acceleration belts which then place them on the automatic insertion belt (32*c*) to bring them onto the transporting mechanism. The mechanism transporting and loading the objects to be sorted comprise swing trays (18) including a catching support fixed to the conveyor, a suspension arm fixed to the catching support, a pivoting tray for receiving an object to be sorted articulated to the other end of the arm and an actuating member associated with the pivoting tray. The swing trays are maintained laterally by a guide rail (8) linked to the frame (11). The actuating member is designed to cause the tray to pivot by gravity into correspondence with a receiving container (30) selected in accordance with the object transported by the tray.

22 Claims, 14 Drawing Sheets

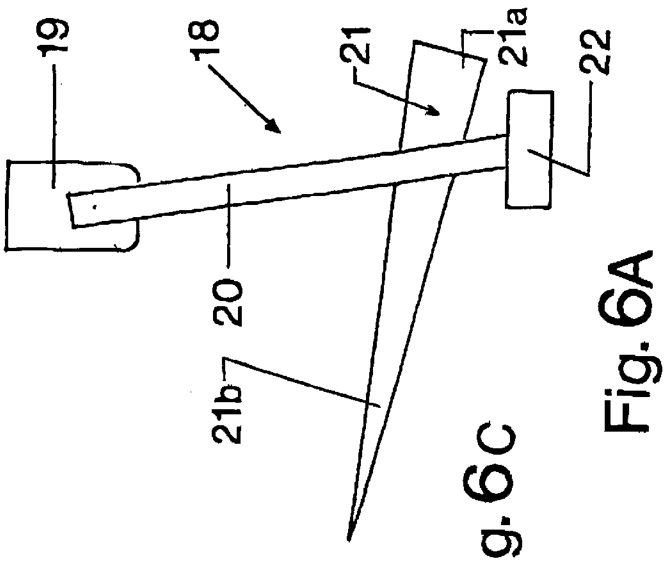
Fig. 6C
Fig. 6A
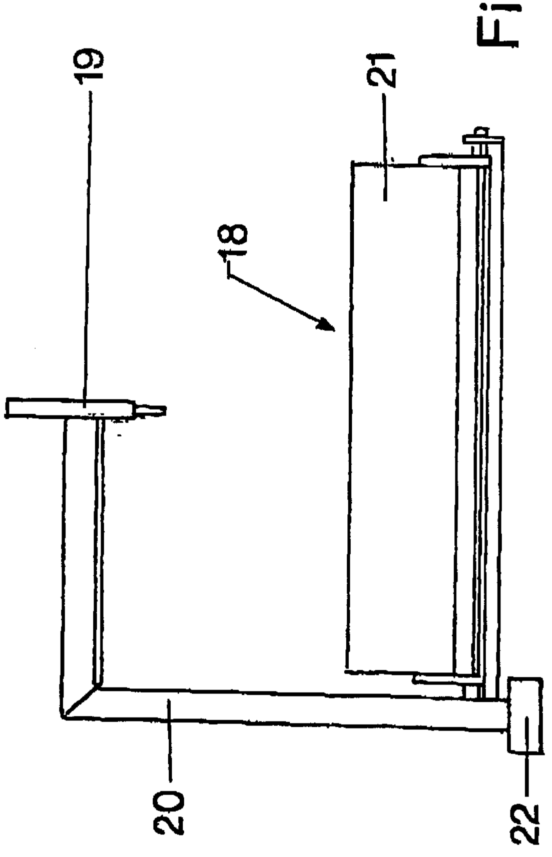
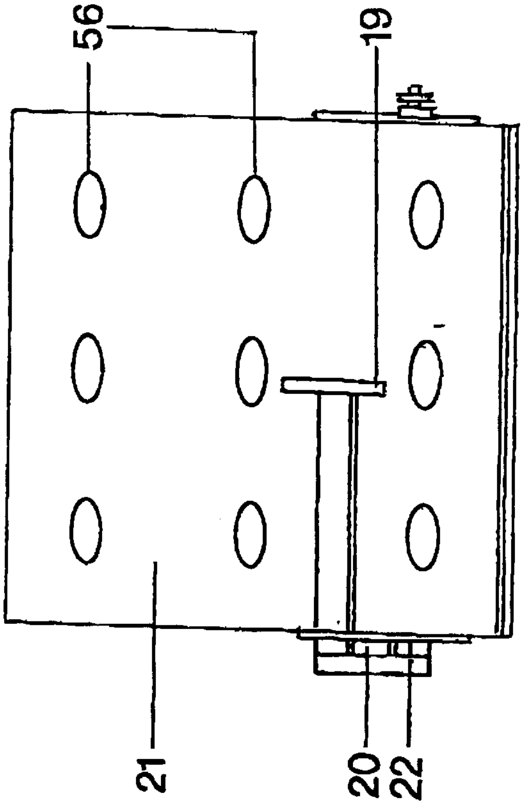
Fig. 6B

AUTOMATIC SELECTIVE SORTING DEVICE

TECHNICAL DOMAIN

The present invention concerns an automatic selective device for sorting objects which differ in physical characteristics such as shape, type, consistency, weight, dimension, and/or volume and for placing these objects in suitable receiving containers, comprising a means for loading the objects, a means for transporting the objects to said receiving containers, and an unloading means for selectively depositing the objects into the receiving containers, wherein said transporting means and said unloading means are combined and comprise a unit of individual supports, each affixed to at least one endless conveyor (15), each support comprising a pivoting tray which receives the object to be sorted and having a front rim and a rear rim defined relative to the direction in which the support is displaced, as well as a device (22) which activates said pivoting tray, said activating device being controlled by an individual control device which, at a predetermined instant, pivots the tray in combination with gravitational force in correspondence with one of said receiving containers (30) selected as a function of the physical characteristics and/or the destination of the object transported by said tray.

PRIOR ART

Devices of this type operating on the basis of various principles are already known in the art. According to one such principle, the objects are transported on trays displaced along the receiving containers in the form of bags or bins and the objects pivot to the side when they reach their destination, then slide off. This method of operation requires the transported object to fall for quite some distance in relation to its size.

According to another operating principle, the tray remains horizontal and when the object reaches its predetermined destination, an electrically driven transverse belt ejects the object laterally. Here again, a considerable distance is required for the object to fall and more importantly, the trajectory of the object is uncertain, as it depends upon the relationship between the weight of the object and its volume.

In other systems, objects fall due to simple gravitational force, and in some cases they are ejected from containers with a movable base that opens automatically when the container passes over the container for which the object is destined.

Yet other systems use gripping devices which grasp the object, hold it while it is being transported, and open at the appropriate time as the object passes over the container for which it is destined.

U.S. Pat. No. 4,318,807 describes another type of device designed to sort beams transported by a moving belt and to deposit the beams in different compartments. To perform these operations, the transporting elements are formed of strong, U-shaped hooks articulated to the end of a rod integral with a guide rail. Due to the design of these elements, this device can only be used for moving large, heavy, compact objects.

The sorting device which is the subject of Japanese Patent Application No. 59 036020 is designed to sort fruit by weight. It has small cups for this purpose which are pivotably attached to an upright metal piece so they can rotate. The cups are locked in horizontal position by a locking system consisting of a lever cooperating with a stop located on the cup. When the device tips, the lever disconnects from the stop and releases the cup.

Prior art devices, in particular those described above, have various disadvantages. The controls that open the gripping devices or containers in certain cases, or which engage the pivoting motion in other cases, are computer driven and executed by activators, electromagnets, pneumatic cylinders, motors, etc. This results in complex, costly devices which do not fully respond to speed and efficiency requirements of sorting objects which vary considerably from one another in size, shape, type, and consistency, such as, for example, heavy packages weighing several kilograms, large but lightweight packages, very lightweight, flexible envelopes weighing several tens of grams, or cylindrical products such as beverage cans that are placed in an unstable manner inside a flexible pouch. Obviously, other types of situations may arise as well.

DESCRIPTION OF THE INVENTION

The object of the present invention is to overcome these disadvantages with an automatic selective sorting device for simultaneously transporting objects which differ in shape, type, consistency, weight, dimension, and/or volume and placing these objects in receiving containers which may have been preselected by means of a rapid, effective, simple and economical device.

This goal is achieved by a device such as the one described in the preamble, characterized in that said loading means comprises at least one storage and unloading buffer system, each equipped with at least one window designed to set an object on an acceleration belt, and one automatic insertion belt located downstream from the acceleration belt to deposit the objects on the pivoting trays of the individual supports that are located near at the rear edges of these trays, in that each individual support for said combined transporting and unloading means comprises a pivoting means to allow the tray to pivot from front to back relative to directions in which the individual supports are displaced, and in that the pivoting tray for each support overlaps the conveyor.

According to a preferred embodiment, the device comprises at least one guide rail for the individual supports and one guide element associated with each individual support which prevents said individual support from falling off the trajectory defined by the endless belt.

According to an interesting embodiment, the activating device comprises a coil spring designed to release enough energy to cause the pivoting plate to pivot, said coil spring being attached to an axle, having one end connected to said pivoting tray and one end connected to a fixed element on the individual support.

This activating device may comprise a disc-shaped cam with a peripheral notch which cooperates with a release to make the cam pivot and release the energy in the coil spring.

Said release preferably comprises an angled lever pivoting on an axle and holding two wheels located at each of its extremities, respectively, said wheels respectively cooperating with a device that controls the pivoting of the pivoting trays and with the cam.

Said angled lever is advantageously pushed into the stopped position by a spring.

According to one variation, the activating device may comprise a locking/unlocking mechanism that slides longitudinally and which is integral with the individual support, and which also may cooperate with a stop, integral with the pivoting tray, said locking/unlocking element being activated by an activating finger that pivots on an axis and is activated by a movable block integral with the frame of the device.

According to a first embodiment, each of said individual supports consists of a swing tray comprising a hook support attached to the conveyor and a suspension arm attached at one end to the hook support, and comprising at the other end, the pivoting tray which is attached in such a way that it remains inclined toward the front while objects are being transported.

In a particularly advantageous manner, the suspension arm of each swing tray is inclined from the vertical and it is angled in such a way that the center of gravity of the pivoting tray is located essentially on the vertical from the suspension point of the arm of the hook support.

According to a second embodiment, each of said individual supports consists of a pivoting tray attached directly to the conveyor.

In general, the pivoting tray comprises a surface for receiving objects defined in the front by a rectangular vertical rim and on each of its lateral sides by a triangular vertical rim, with the rear edge of the tray being open.

Advantageously, the receiving surface of the pivoting trays may be perforated.

According to another embodiment, the pivoting tray may comprise a moving belt located on the surface which receives the objects, said belt operating in a loop driven by two parallel rollers located near the front edge and near the rear edge of the tray, respectively.

Advantageously, the roller located at the front of the tray comprises a means which causes it to rotate when said tray pivots in order to active movement of the belt.

Advantageously, the means for driving the front roller comprises a friction drive wheel attached to the rotational axis of said roller and cooperating with a rail parallel to the guide rail for the individual supports when the pivoting tray pivots.

Since the trays pivots from front to back, the belt moves in the opposite direction to the direction in which the pivoting tray pivots.

The acceleration belt for the loading means moves faster than the displacement speed of the individual supports on the transporting means.

In the preferred embodiment of the device, when objects are transferred from the loading means to the transporting means, the automatic insertion belt is located in the extension of the pivoting tray while the objects are being deposited and it overlaps the rear edge of said tray while the objects are being transferred.

Said means for locating the objects onto the pivoting trays may advantageously comprise a manual insertion belt located upstream of the acceleration belt.

Advantageously, the at least one window in the storage and unloading buffer system comprises two movable armatures holding, at one free extremity, the free end of a retractable lateral curtain, said armatures being connected to two activators, while the other end of the retractable lateral curtain is connected to a spring roller and the activators preferably are pneumatic cylinders.

DESCRIPTION OF THE DRAWINGS

The features of the present invention will be more apparent from the following description of different modes of embodiment, with reference to the attached drawings, wherein:

FIGS. 6A, 6B and 6C are detailed views of the individual supports for the objects to be sorted;

HOW THE INVENTION IS ACHIEVED

Figure 1:
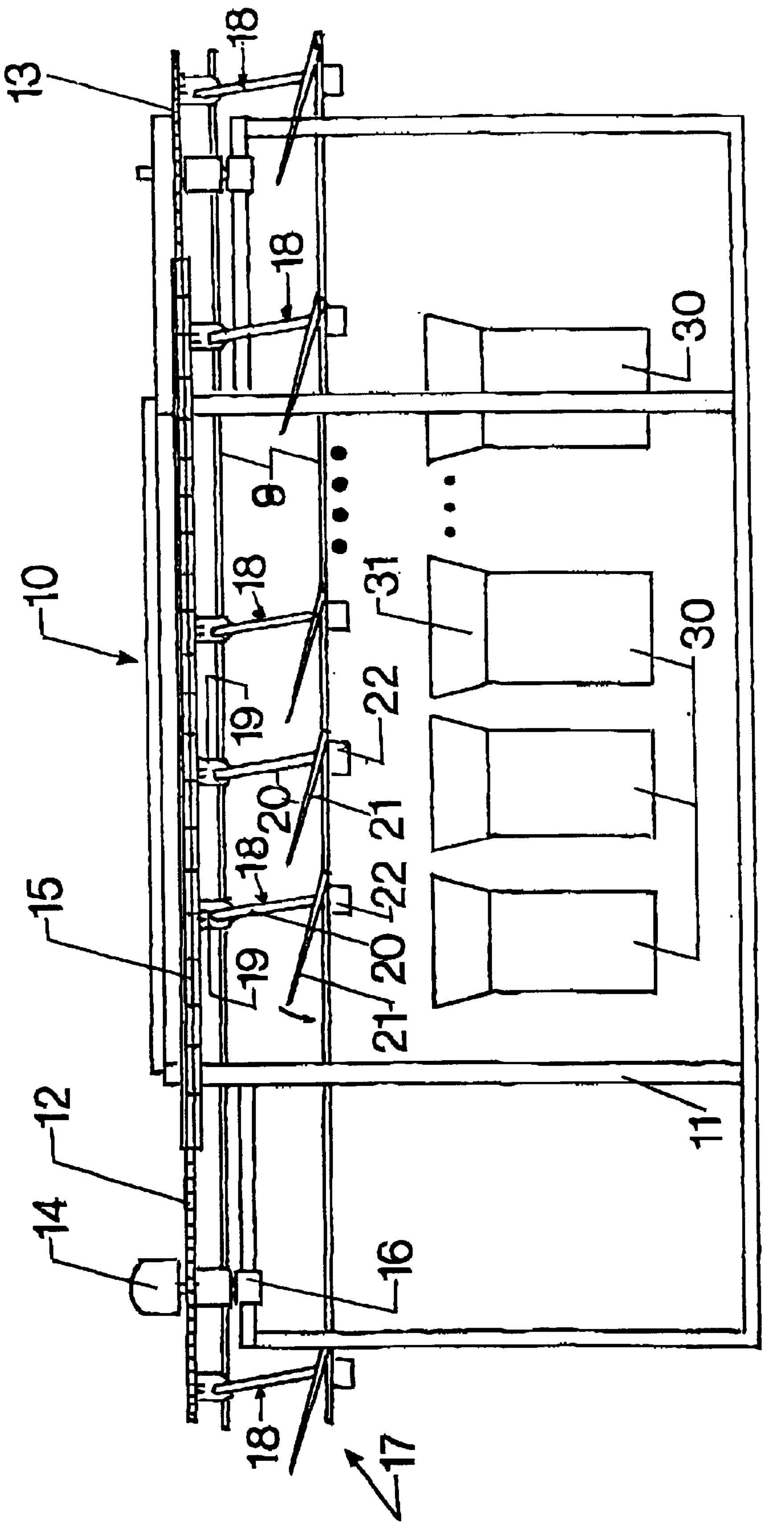
FIG. 1 is an elevation of the device according to the invention illustrating in particular a preferred embodiment of the transporting and unloading means.
Figure 2A:
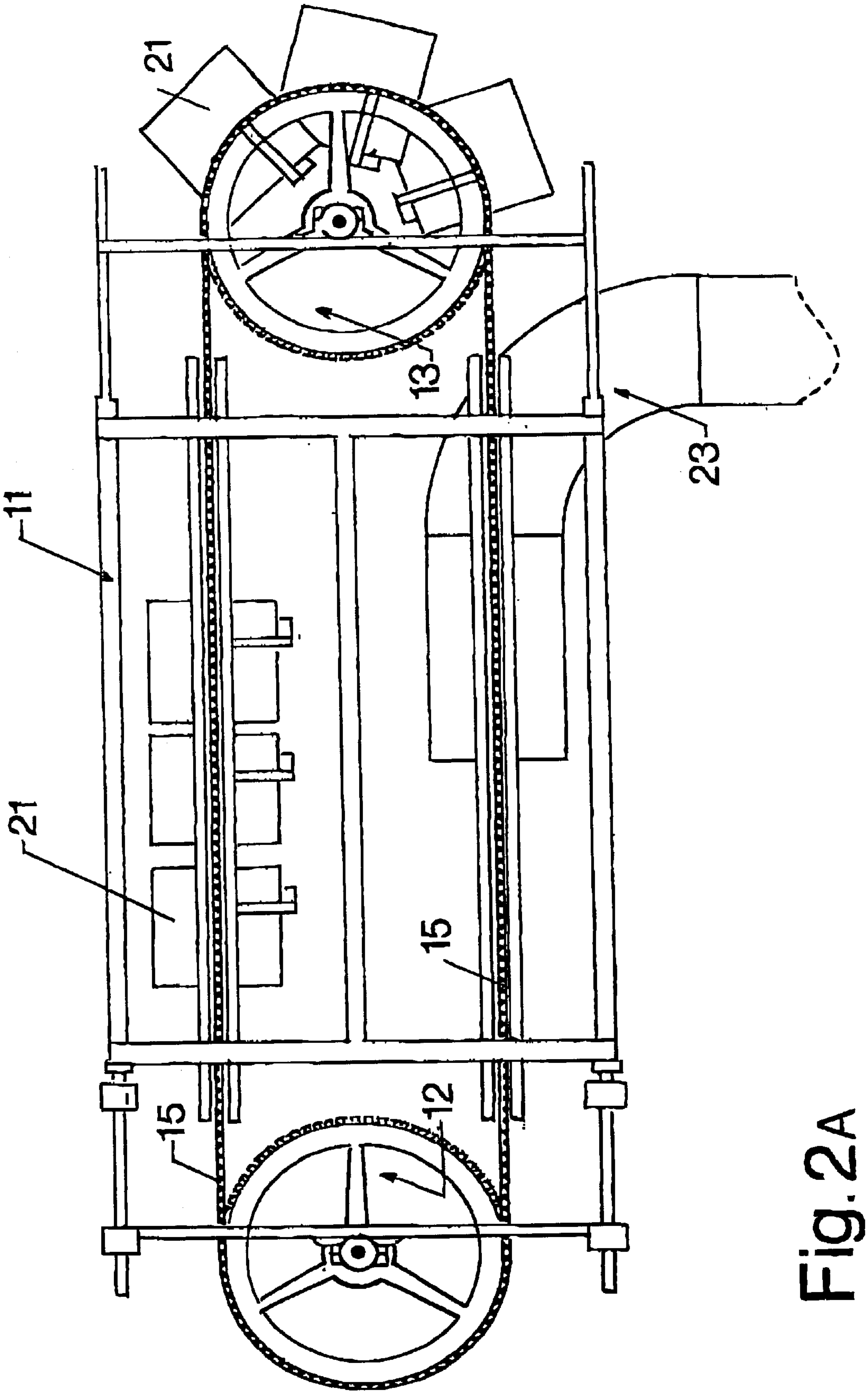
FIGS. 2A, 2B, and 2C are overhead views of the embodiment of FIG. 1 illustrating three different principles for positioning the loading means.
Figure 2B:
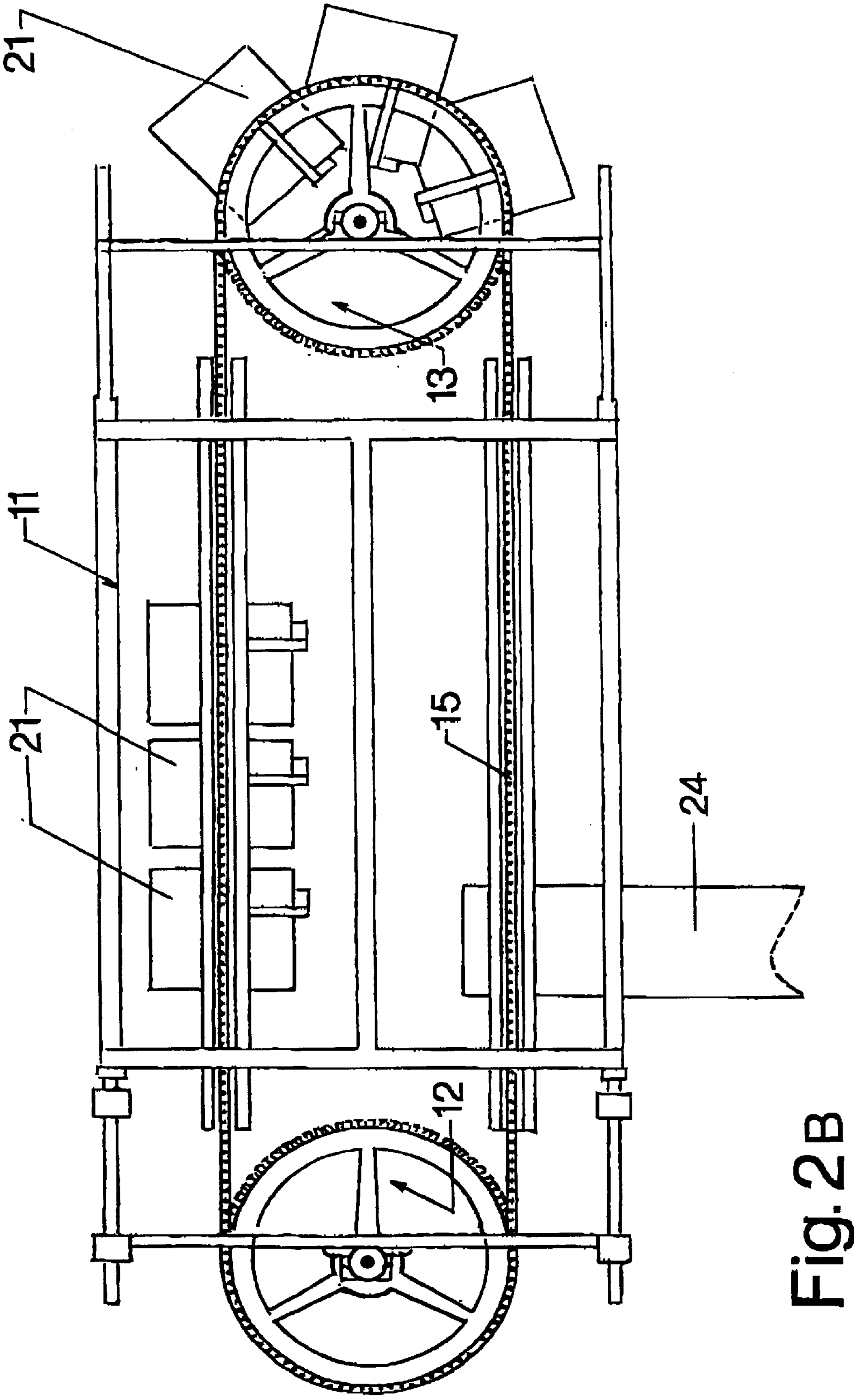
Figure 2C:
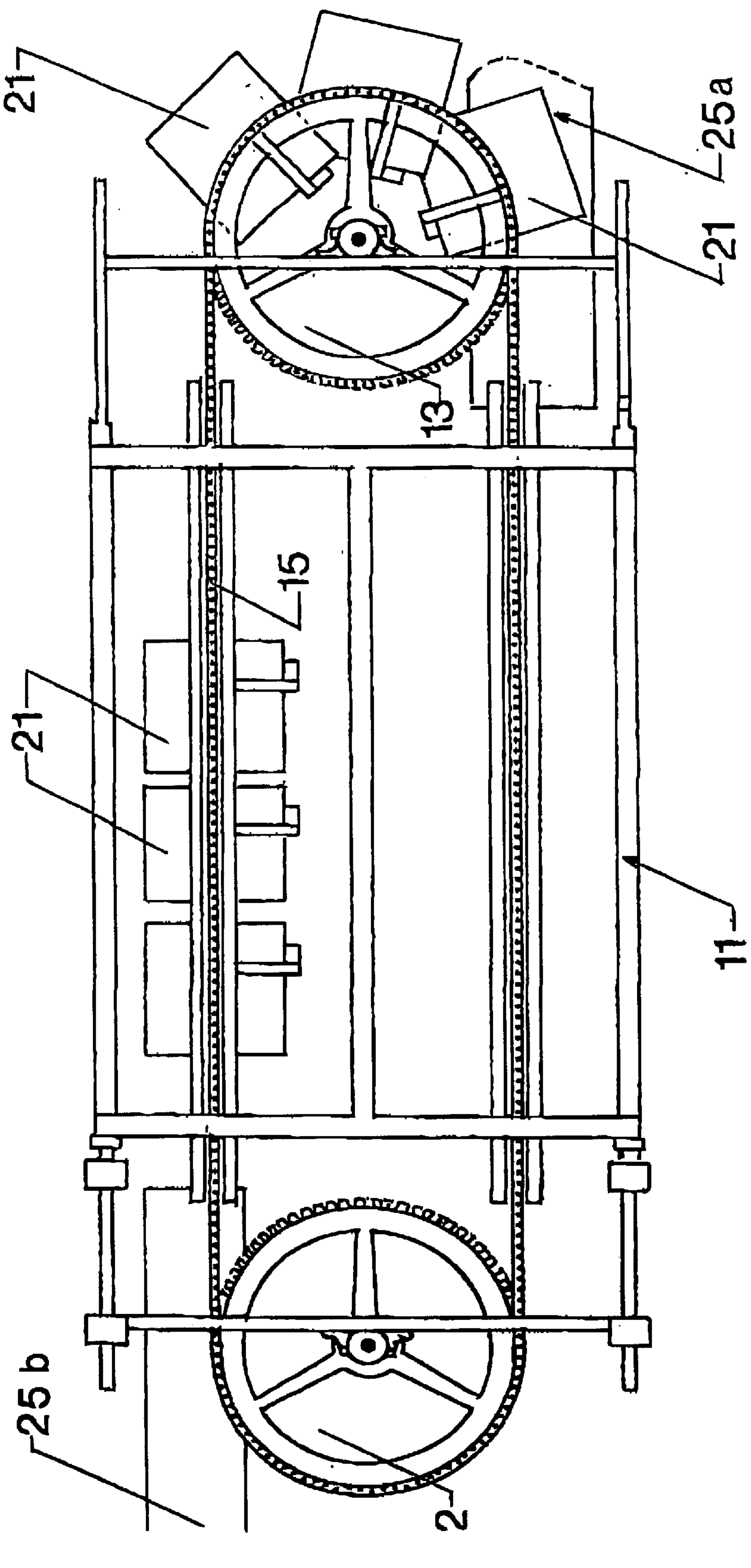
Figure 3:
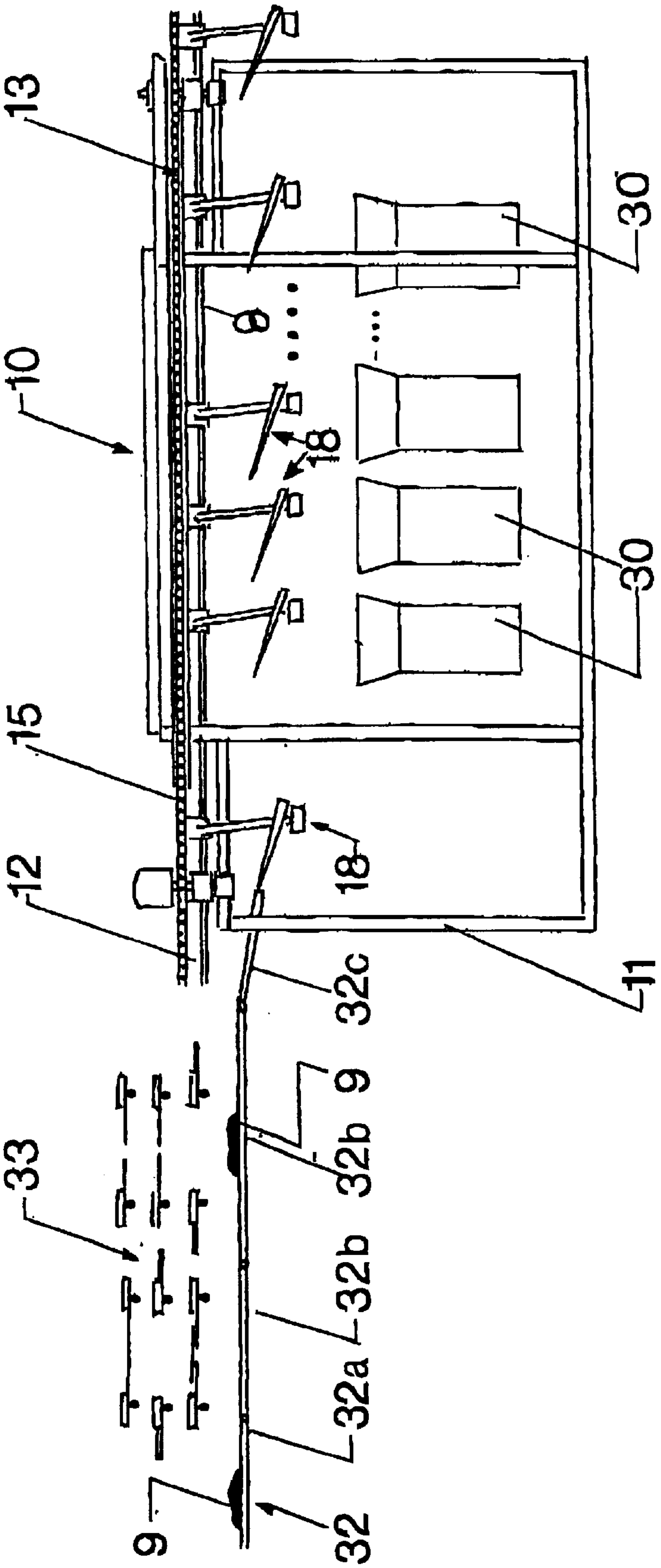
FIG. 3 is an elevation showing the device of the invention equipped with a first embodiment of the loading means and the receiving containers.

Device 10 for automatically selecting objects according to the invention, as shown in the drawings and in particularly in FIGS. 1 through 3, comprises a frame 11 which supports, in the example shown, two wheels 12 and 13, for example, toothed wheels driven by a motor 14 and which support an endless belt 15, for example, a chain loop defining a continuous transport circuit. The chain may consist of conventional links joined by articulating axles that are parallel to each other. It may also consist of double articulated links, which provide additional range of motion and allow it to be displaced on several planes. Any other flexible reinforced band type conveyor can be used. Each of the two wheels is located at an extremity of frame 11. Two adjusting elements 16 (not shown in detail) are attached to the frame for regulating the tension of conveyor 15.

The means 17 for transporting and unloading objects, adapted on conveyor 15, are composed in the example shown of individual supports consisting of swing trays 18 comprising a hook support 19 attached to conveyor 15, a suspension arm 20 attached at one end to hook support 19, a pivoting tray 21 articulated to the other end of suspension arm 20 and an activation device 22 associated with pivoting tray 21. Swing trays 18 are maintained in position laterally by at least one guide rail 8. This rail is parallel to the endless conveyor 15 and integral with frame 11. It may be affixed to this frame either at hook support 19, at suspension arm 20 near pivoting tray 21, or at some intermediate level between these two positions. Only one guide rail is necessary to prevent the swing trays from falling off the trajectory defined by conveyor 15. However, it would also be possible to provide two rails, thereby eliminating any risk of lateral imbalance, particularly on the curves formed by endless conveyor 15. The connection between the swing tray and rail 8 may be established by a guide element such as a guide wheel, a slide or some other suitable means known in the art.

Beneath swing tray 18 suspended on conveyor 15 are the receptacles, in this case receiving containers 30, each surmounted by a guide chute 31 which guides the objects initially carried by pivoting trays 21 of swing trays 18 toward the openings in receiving containers 30, said trays having first pivoted and then discharged the objects they were transporting.

As shown more specifically in FIG. 2A, loading may take place in a central zone of a rectilinear portion of conveyor 15 according to the first principle of placing the objects on the transporting and unloading means 17. In this case, the loading operation is performed tangentially in relation to the rectilinear portions of conveyor 15. Note that in this embodiment the loading means 23, which is illustrated schematically, necessarily forms a curve that could be considered a disadvantage because it complicates construction or requires that the operation slow down to prevent objects from being ejected when they are transported around the curve. On the contrary, this loading principle offers the advantage of "multi-loading," that is, it allows several identical or similar loading posts (not shown) to be distributed along the rectilinear portions of the conveyor, improving the output of the device by increasing the number of full trays in each cycle and actually optimizing its capacity.

As shown more specifically in FIG. 2B, loading can also take place in a central area of the rectilinear section of conveyor 15 according to a second principle of positioning objects on the transporting and unloading means. In this case, loading takes place perpendicular to the rectilinear portions of conveyor 15. This type of loading is not the most rapid, but loading means 24 may comprise several loading stations (not shown) distributed along the rectilinear portions of the conveyor, thus ensuring that the individual supports holding the objects to be sorted are optimally loaded.

A third principle for placing the objects on the transporting and unloading means is illustrated in FIG. 2C. In this case, the loading operation is performed tangentially from a toothed wheel at one extremity of each of the two rectilinear portions of conveyor 15. The loading means comprises two loading stations 25*a* and 25*b*. This arrangement eliminates any curve and consequently, it simplifies installation and performs at a higher speed.

FIG. 3 is an elevation of the entire device 10 of the invention; it is a more specific illustration of the principal stages of operation, particularly with respect to the means for loading the swing trays located at the entry to frame 11, on the left of the drawing. This loading means comprises a line of conveyor belts 32 composed, in the example shown, of a manual insertion belt 32*a,* two acceleration belts 32*b,* and an automatic insertion belt 32*c*. Manual insertion belt 32*a* is used for depositing objects such as, for example, large envelopes to be placed on a swing tray for eventual sorting. Acceleration belts 32*b* are respectively located on two columns of a storage and a unloading buffer system 33 that moves the objects to be sorted and deposits them on the acceleration belt, which in turn places them on automatic insertion belt 32*c*. This automatic insertion belt is located in the extension of pivoting tray 21 when the objects are deposited and it overlaps the rear edge of said tray while the objects are being transferred, said rear edge being defined relative to the direction in which the individual supports are displaced. Each column in the storage and unloading buffer system 33, shown in more detail in FIG. 4, comprises a transverse conveyor (not shown) which cooperates with three windows 34, 35, 36 with retractable lateral curtains 37 for depositing objects 9 on acceleration belt 32*b*. Each window comprises two movable armatures 38 which support, at one free end, the free end of a retractable lateral curtain 37, said armatures being connected to two activators, for example, two pneumatic cylinders 39 or the like, and the other extremity of the retractable lateral curtain being connected to a spring roller 40.

A computerized central control unit regulates the opening of retractable lateral curtains 37 on each window to ensure that the objects for sorting 9 are first deposited on acceleration belt 32*b,* then on automatic insertion belt 32*c,* and finally on pivoting trays 21 of swing trays 18. Note that there is a larger number of swing trays than of receiving containers 30, which optimizes the output of the automatic sorting device 10 of the invention.

Figures 4A, 4B, 4C, 4D, 4E, 4F:
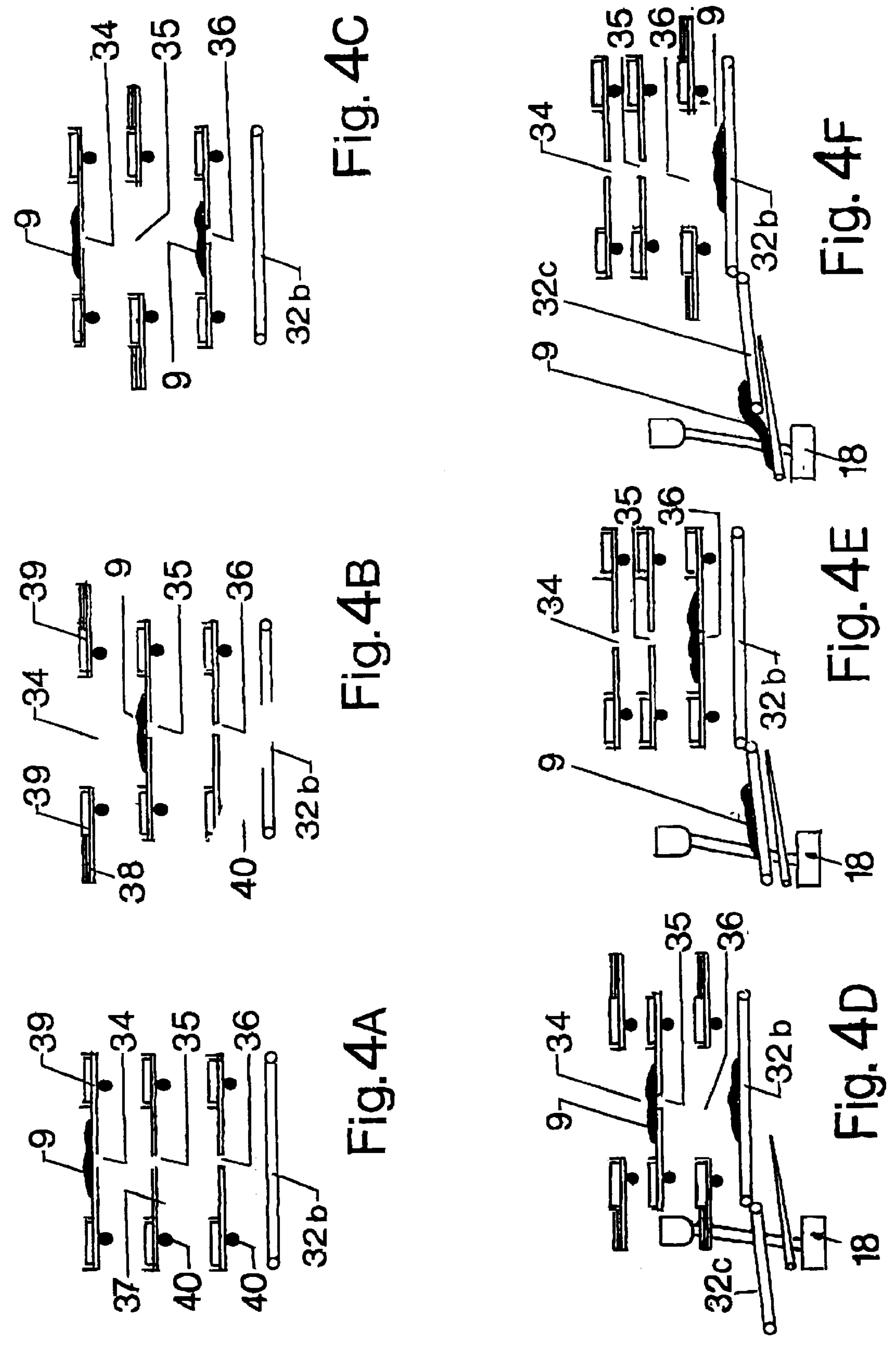
FIGS. 4A, 4B, 4C, 4D, 4E and 4F show the operational mode of the first embodiment of the loading means illustrated in FIG. 3.

FIGS. 4A through 4F illustrate in greater detail the operating mode of the loading means shown in FIG. 3. FIG. 4A illustrates a first phase, during the course of which an object 9, for example an envelope, has been deposited by the conveyor on the corresponding upper window 34. The three superimposed windows 34, 35 and 36 are closed. FIG. 4B shows a second phase during the course of which upper window 34 is open, allowing object 9 to be deposited on intermediate window 35 which, along with lower window 36, is still closed. FIG. 4C illustrates a third phase in the course of which upper window 34 is reclosed, intermediate window 35 is open, and lower window 36, which has received object 9, is still closed. Closed upper window 34 has simultaneously received a new object 9 that will follow the same course as the preceding object. FIG. 4D shows a fourth phase in which upper window 34 is open to allow the second object 9 to be deposited on intermediate window 35, previously closed. Lower window 36 opens and has deposited the first object 9 onto acceleration belt 32*b*. FIG. 4E illustrates a fifth phase during which upper window 34, as well as intermediate window 35, are closed, with lower window 36 now holding the second object 9. The first object 9 is simultaneously evacuated by acceleration belt 32*b* toward automatic insertion belt 32*c*. FIG. 4F illustrates a sixth phase during which upper window 34 as well as intermediate window 35 are again closed. Lower window 36 is open and the second object 9 has been deposited on acceleration belt 32*b*. Simultaneously, the first object 9 is deposited on pivoting tray 21 of swing tray 18.

The loading system for the device of the invention is not limited to the embodiment described herein. The number of superimposed windows used as buffers could be increased to boost sorting speed. In addition, the number of loading stations located long the conveyor could be increased.

Figure 5:
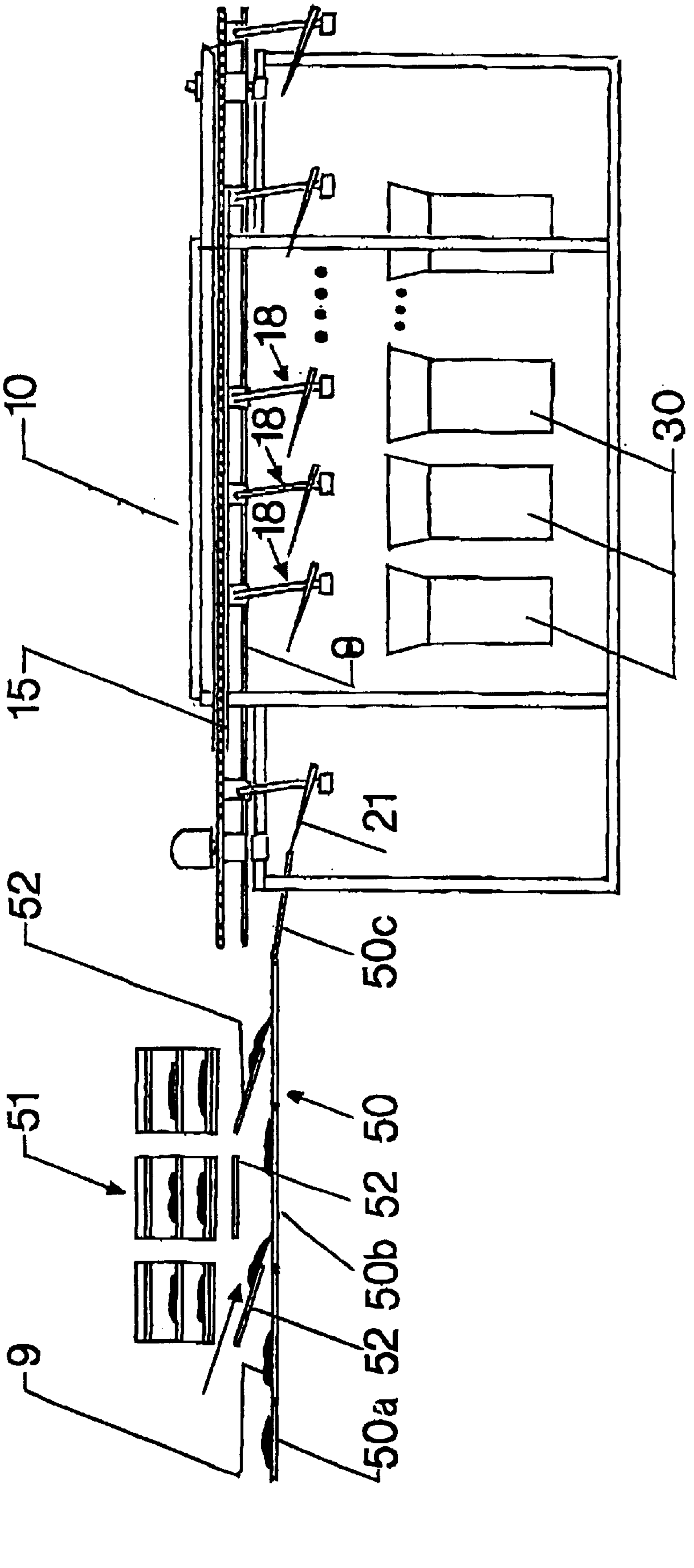
FIG. 5 is an elevation representing the device according to the invention equipped with a second embodiment of the loading means and receiving containers.

FIG. 5 is a view similar to FIG. 3, but in this instance, automatic sorting device 10 of the invention is equipped with a second embodiment of the loading means. The latter comprises a line of transporting belts 50 comprising, for example, a manual insertion belt 50*a,* at least one acceleration belt 50*b,* and an automatic insertion belt 50*c*. Acceleration belt 50*b* is located beneath three columns of a three-level buffer storage and unloading system 51, said three columns corresponding to three pivoting belts 52, respectively. The function of pivoting belts 52 is to effect the transition between the columns of the storage/unloading buffer system and acceleration belt 50*b* which transfers the objects to automatic insertion belt 50*c* before they are deposited on pivoting trays 21 of swing trays 18.

FIGS. 6A, 6B and 6C represent a swing tray 18 for transporting the objects for sorting. Note that suspension arm 20 of this swing tray is inclined and forms an acute angle from the vertical. This angle is regulated so that the center of gravity of loaded pivoting tray 21, i.e., the tray and its load together, is located approximately on the vertical from the point at which arm 20 is connected to hook support 19. In addition, pivoting tray 21 is also inclined and it forms an acute angle from the horizontal that can be regulated as a function of the loaded objects it transports, while the front edge of the tray, defined relative to the direction in which the hook support is displaced, is lower than the rear edge. This inclination allows the objects to remain on the pivoting tray while they are being transported, particularly on the turns along the trajectory of the swing trays.

As shown more specifically in FIG. 6A, pivoting tray 21 comprises a surface for receiving objects that is defined in the front by a rectangular vertical rim 21*a* and by two triangular lateral rims 21*b*, while rear rim 21*c* of the tray remains open. The two raised lateral rims 21*b* extend from the rear rim of pivoting tray 21 to the raised front rim 21*a* so as to form a barrier preventing objects from sliding off the tray when it is displaced. Suspension arm 20, laterally attached to hook support 19 connected to the conveyor, is angled and pivoting tray 21 thus overlaps said conveyor.

FIG. 6B essentially illustrates pivoting tray 21 which has perforations 56. By way of example, these perforations may be circular, oblong, or another shape and they may be distributed regularly along the tray surface. The purpose of the perforations is to facilitate evacuation of the objects when tray 21 pivots, particularly light objects such as envelopes or the like. The dimension of the perforations may be adapted to the physical characteristics of the objects for sorting.

Figure 7:
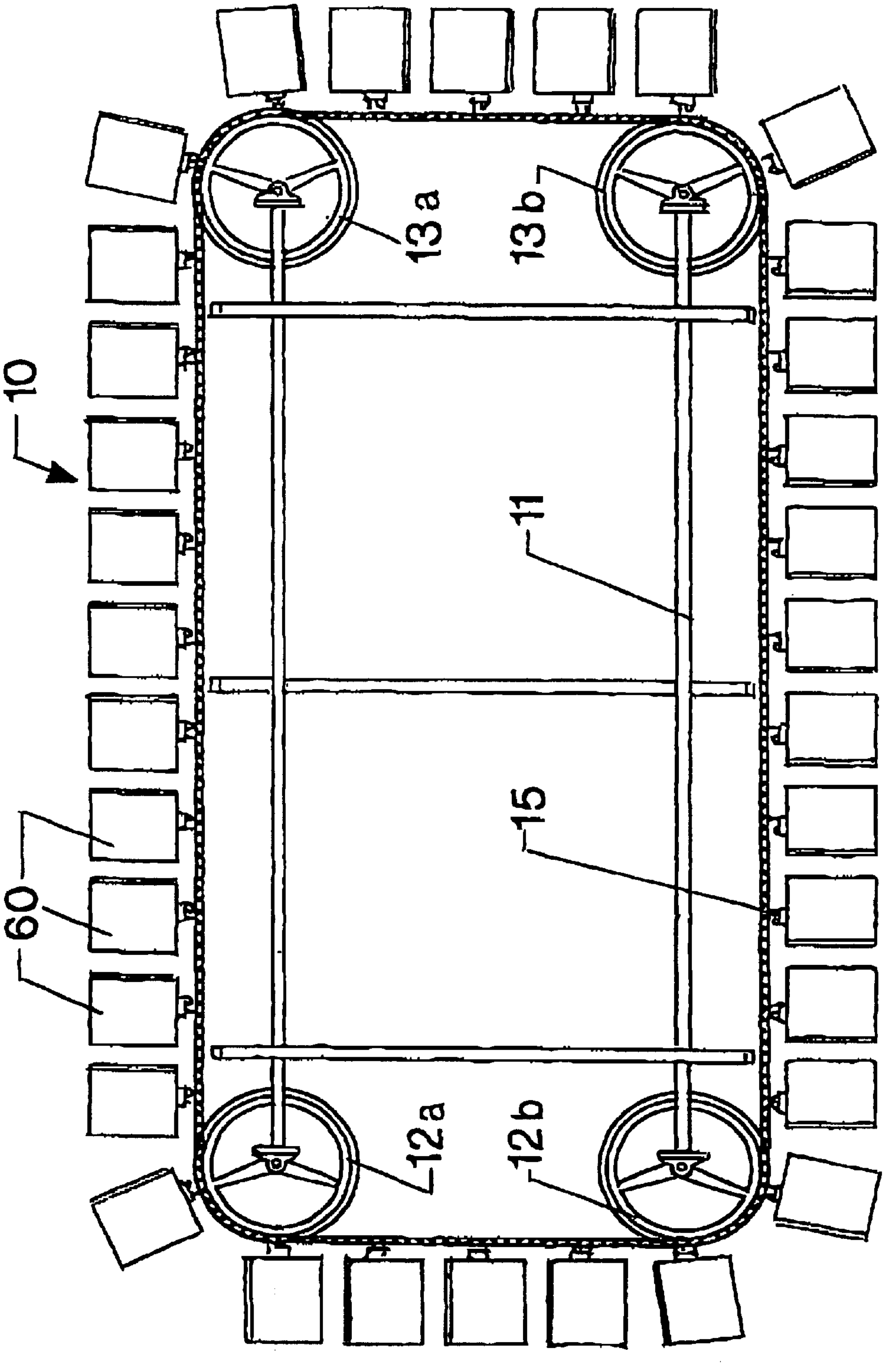
FIG. 7 is an overhead view of the device of the invention illustrating another embodiment of the transporting and unloading means.

FIG. 7 illustrates a second embodiment of the transporting and unloading means. Automatic selective sorting device 10 comprises a frame 11 which, in the example shown, supports two pairs of motor driven toothed pinions 12*a*, 12*b* and 13*a*, 13*b* with a chain loop extending between them to define an endless conveyor 15.

The means for transporting and unloading objects to be sorted attached to conveyor 15 is composed, in the example shown, of individual supports consisting of pivoting trays 60 attached directly to conveyor 15 instead of being suspended from arms as in the case of the swing trays. The advantage of this arrangement is that the trays can be spaced together tightly. When using swing trays, it is actually imperative to provide a safety buffer between two adjacent swing trays, since there is a risk of collision due to balancing on turns. Consequently, this embodiment may prove more useful than the one which uses swing trays. Additionally, pivoting trays 60 are inclined, allowing them to overlap, thereby increasing the output of the sorting line further. However, this arrangement requires that the conveyor belt be of very sturdy design, since the pivoting trays are cantilevered. If the conveyor belt is a chain, it should preferably be a double chain. If the conveyor belt is a flexible band, the band must be reinforced in order to support the weight of the pivoting trays and the objects transported.

Figure 8A:
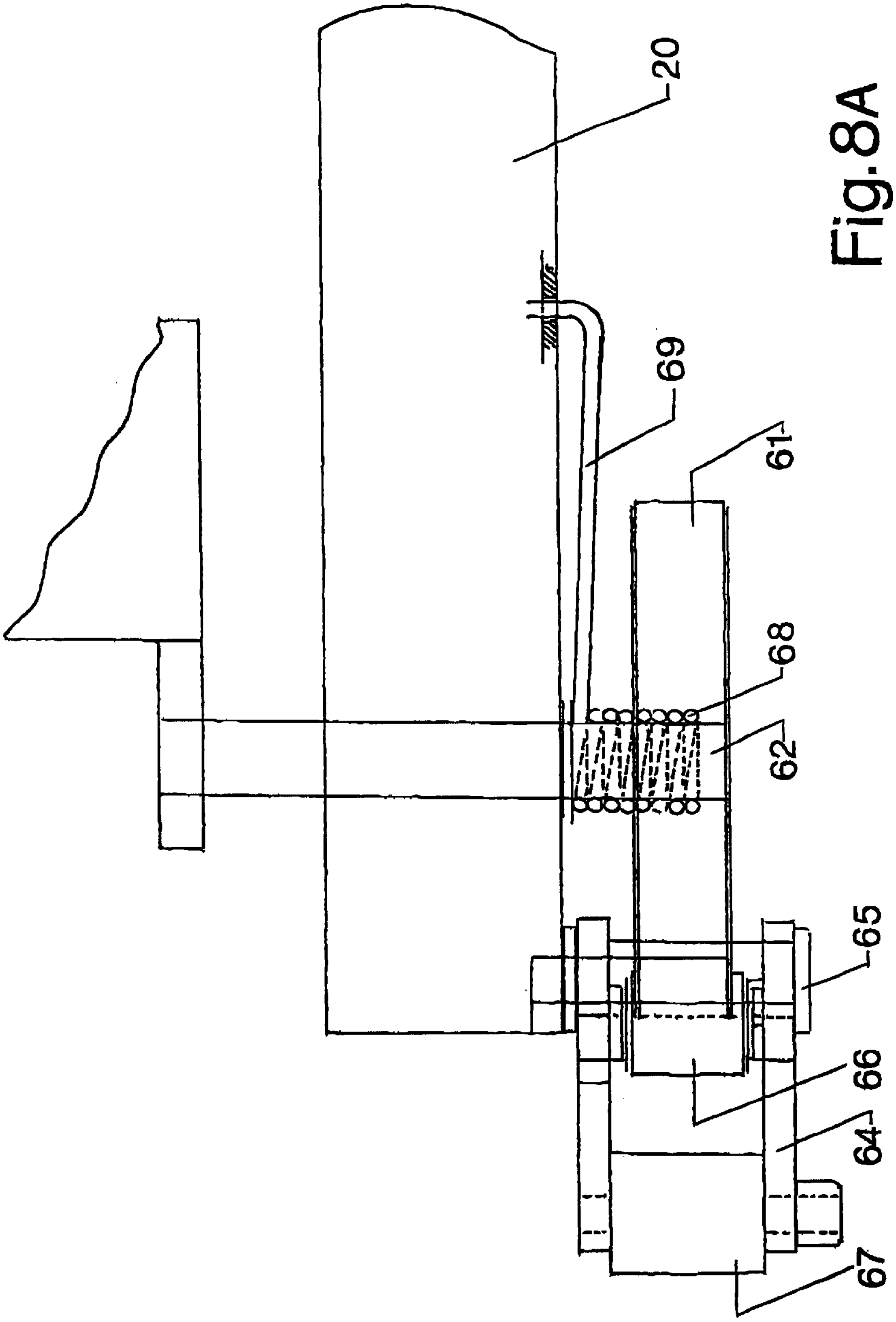
FIGS. 8A and 8B illustrate front and lateral elevations of the means for activating a pivoting tray.
Figure 8B:
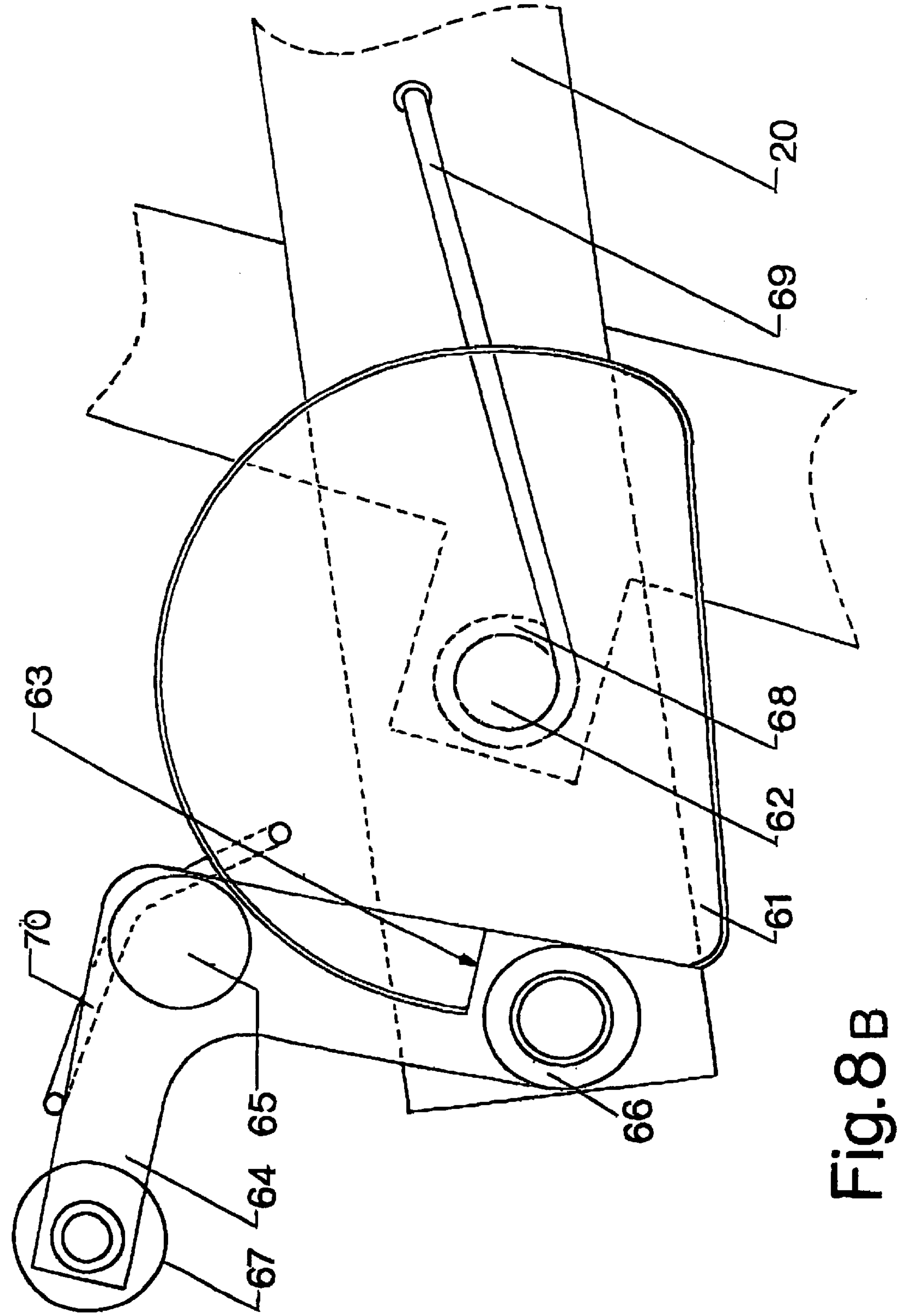

FIGS. 8A and 8B are detailed views of the activation deice 22 for pivoting trays 21 on swing trays 18, or pivoting trays 60 laterally attached to the conveyor. As shown in the drawings, activation device 22 essentially consists of a cam 61 in the form of a circular disc, partially truncated and attached to an axle 62. This cam has a peripheral notch 63 that cooperates with a release 64 in the form of an angled lever pivoting on a fixed axle 65 and supporting two wheels 66 and 67, respectively, attached to each end of the lever. Axle 62 holds a coil spring 68, one end of which is attached to said axle which is connected to cam 61. An end branch 60 of coil spring 68 is connected to swing tray arm 20 or directly to pivoting tray 60 when the latter pivots on axle 62, as is the case in the embodiment illustrated in FIG. 7. Release 64 is pushed into the stopped position shown in FIG. 8B by spring 70. When the release is pivoted by some element such as, for example, a rigid rod (not shown) that is controlled automatically by a device such as, for example, an electromagnet, a cam, a motor, or the like, it releases the cam that locks the pivoting tray in stopped position, thus allowing the tray to pivot under the dual effects of its own weight and the coil spring armed in this position. Thereafter, the object carried by the pivoting tray is discharged and it falls in the appropriate receiving container. Next, the spring is re-armed and the tray is simultaneously returned to the upright position. The coil spring is designed to make the pivoting tray pivot forcefully to drive the objects, particularly lightweight objects, and accelerate their fall into the appropriate receiving containers.

Figure 9:
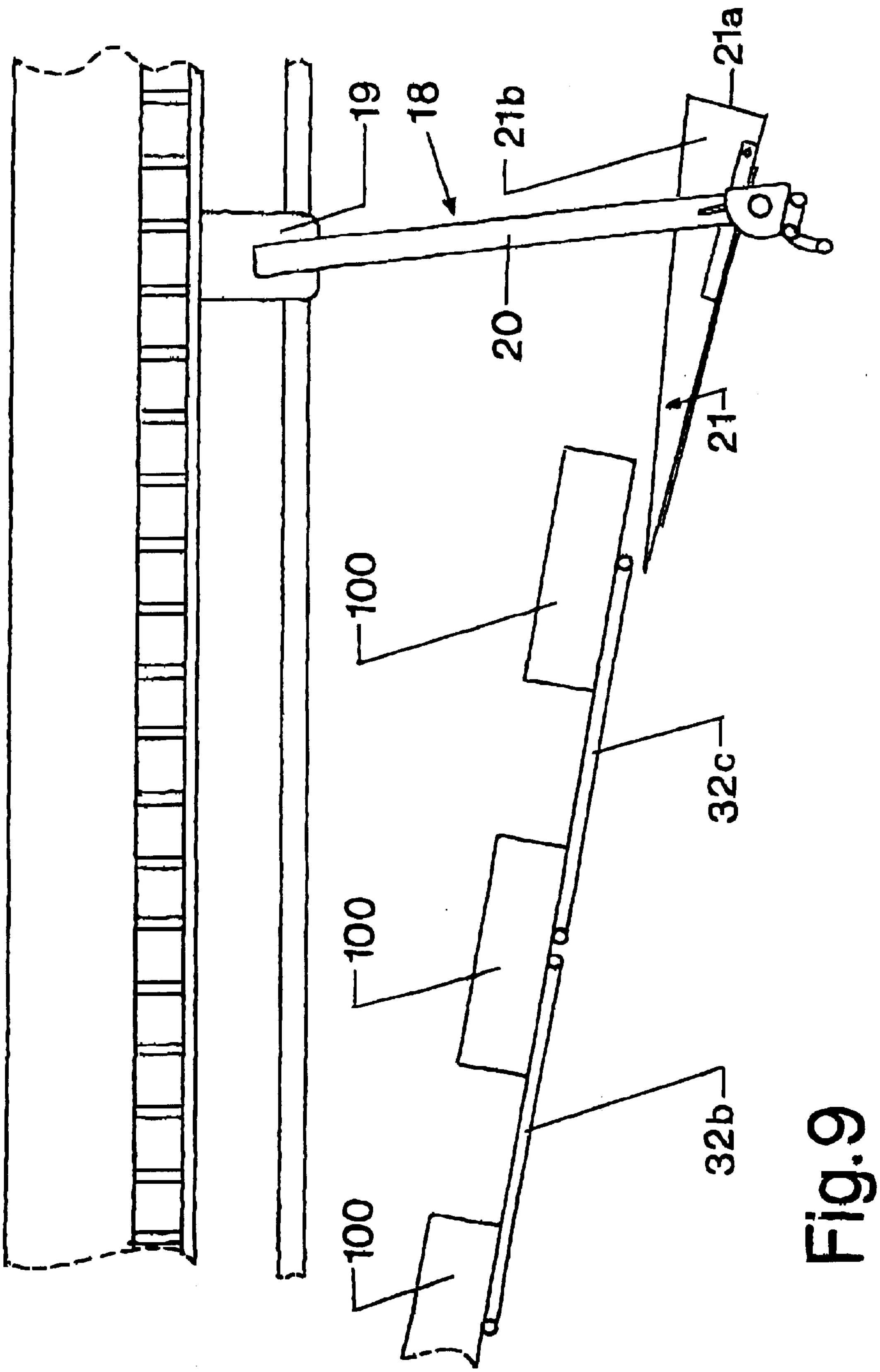
FIG. 9 is a detailed view showing how a swing tray is loaded with objects consisting of packages.

FIG. 9 illustrates the operation of loading the swing trays with objects consisting of packages 100. These packages pass from acceleration belt 32*b* onto automatic insertion belt 32*c*, then onto pivoting tray 21 of swing tray 18. Because this tray is inclined, loading takes place from the rear of the tray and the package slides against raised front rim 21*a* of the tray, which may also comprise raised lateral rims 21*b* for retaining the objects, particularly when swing trays turn as they move along the trajectory.

Figure 10A:
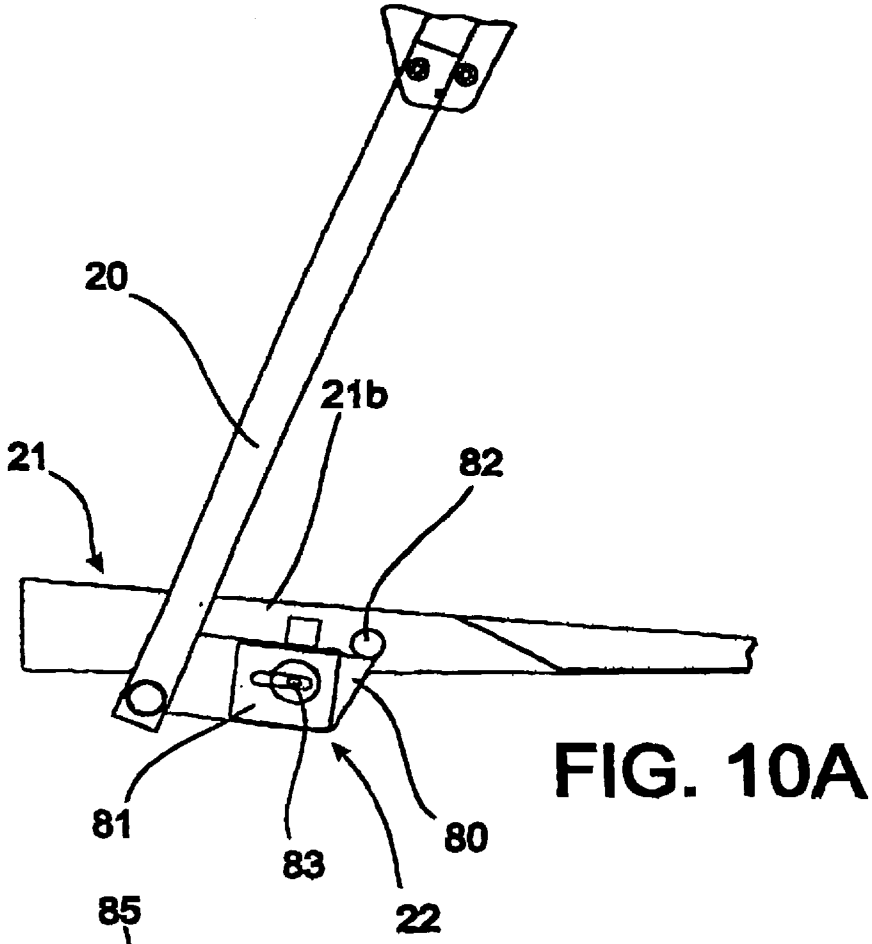
FIGS. 10A and 10B are a lateral view and an overhead view, respectively, of a variation of the means for activating a pivoting tray.
Figure 10B:
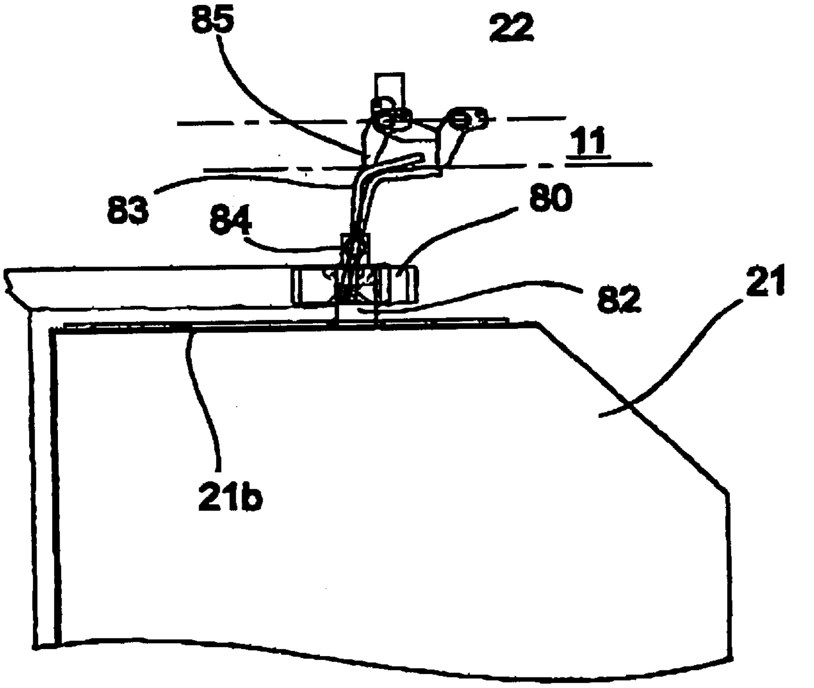

FIGS. 10A and 10B illustrate a variation of the device that activates the pivoting of pivoting trays 21. In this arrangement, activation device 22 is composed of a longitudinally slidable locking/unlocking element 80, located in a housing 81 joined to suspension arm 20, and a stop 82 joined to lateral rim 21*b* of pivoting tray 21. This stop 82 is designed to remain in contact with one extremity of locking/unlocking element 80 while the objects are being transported, and to be released at the instant the tray pivots to unload an object it is carrying. Locking/unlocking element 80 is activated by a finger 83 consisting of an angled cylindrical rod, forming an obtuse angle in a horizontal plane, and pivoting on a vertical axis 84. One extremity of this finger 83 is located inside housing 81 and contacts a longitudinal spring joined to locking/unlocking element 80. When the tray pivots, the angled portion of other extremity forms a contact with a retractable movable stop 85 integral with frame 11 of device 10. The displacement of tray 21 and, consequently, of the curved extremity of finger 83 below stop 85 causes finger 83 to pivot and compress the spring connected to locking/unlocking means 80, which retracts and releases stop 82, thereby causing the tray to pivot.

Figure 11:
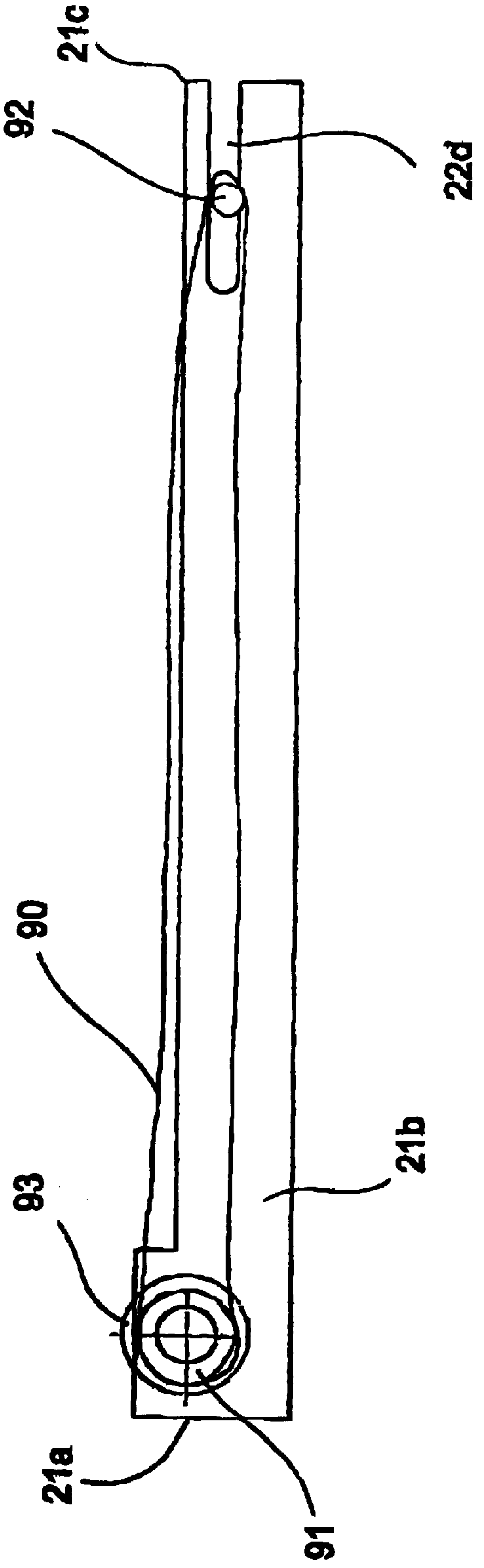
FIG. 11 is a partial lateral view of a pivoting tray equipped with a belt for unloading.

FIG. 11 is a partial representation of an embodiment of tray 21 equipped with a moving belt that improves the discharge of objects.

To achieve this, tray 21 has on its receiving surface a belt 90 moving in a loop extending between two rollers 91 and 92, respectively located near front rim 21*a* and rear rim 21*c* of the pivoting tray. Roller 91, which is the belt drive roller, is joined to a friction drive wheel 93 attached to the rotational axis of said roller 91 on the exterior of the lateral rim 21*b* of pivoting tray 21. When the tray pivots from front to back, this drive wheel 93 comes into contact with a rail (not shown) that is parallel to guide rail 8. This rail is located above the swing trays at a distance calculated to prevent guide wheel 93 from contacting the rail when tray 21 is displaced inside device 10, such that the belt only operates when tray 21 is activated to pivot. Engaging the pivoting of the tray for unloading brings the wheel into contact with the rail provided for this purpose, and the pivoting motion, which takes place from front to back, activates moving belt 90 which then proceeds in the opposite direction to the direction in which the tray is moving, thus accelerating the unloading process. There is a notch 22*d* formed in either end of rims 21*b* for positioning roller 92 and displacing it in order to regulate the tension of belt 90.

In the various embodiments of the device of the invention, it is also possible to equip the guide rail with a means for adjusting the chain that forms the endless conveyor in order to maintain the trajectory of the swing trays.

What is claimed is:

1. An automatic selective device for sorting objects which differ in physical characteristics such as shape, type, consistency, weight, dimension, and/or volume and for placing these objects in suitable receiving containers, comprising a mechanism for loading the objects, a mechanism for transporting the objects to the receiving containers, and an unloading mechanism for selectively depositing the objects into the receiving containers, wherein the transporting mechanism and the unloading mechanism are combined to form a unit of individual supports each attached to at least one endless conveyor belt (15), each support comprising a pivoting tray which receives an object for sorting and having a front rim and a rear rim defined relative to the direction in which the support is displaced, as well as an activation device (22) for said pivoting tray, said activation device being controlled by an individual control device to cause, at a predetermined instant, said tray to pivot in combination with gravitational force and in correspondence with one of said receiving containers (30) selected as a function of the physical characteristics and/or the destination of the object transported by said tray, characterized in that the loading mechanism comprises at least one storage and unloading buffer system (33; 51) each equipped with at least one window for depositing an object (9) on an acceleration belt (32*b*, 50*b*), and an automatic insertion belt (32*c*, 50*c*) located downstream from the acceleration belt and which deposits objets (9) on the pivoting trays of the individual supports on the side of the trays with the rear rim; in that each individual support for the combined transporting mechanism and the unloading means comprises a pivoting means causing the pivoting tray to pivot from front to back, in terms of the direction in which the individual supports are displaced; and in that the pivoting tray of each support overlaps the conveyor (15).

2. A device according to claim 1, wherein it comprises at least one guide rail (8) for the individual supports and one guide element connected to each individual support to prevent the individual support from falling off the trajectory defined by the endless conveyor (15).

3. The device according to claim 1, wherein the activation organ (22) comprises a coil spring (68) which releases energy and causes the pivoting tray (21) to pivot, the coil spring being attached to an axle (62) and having one end connected to the pivoting tray (21) and one end (69) connected to a fixed element on the individual support.

4. The device according to claim 3, wherein the activating organ (22) comprises a disc shaped cam (61) with a peripheral notch (63) which cooperates with a release (64), causing the cam to pivot and releasing the energy in the coil spring (68).

5. The device according to claim 4, wherein the release (64) comprises an angled lever pivoting on an axle (65) and holding two wheels (66) and (67) respectively located at each of its extremities, the wheels cooperating with a device that controls the pivoting motion of the pivoting trays and with the cam, respectively.

6. The device according to claim 5, wherein the angled lever is pushed into a stopped position by a spring (70).

7. The device according to claim 1, wherein the activation organ (22) comprises a longitudinally slidable locking/unlocking element (80) connected to the individual support and cooperating with a block (82) integral with pivoting tray (21), said locking/unlocking element (80) being activated by an activating finger (83) pivoting on an axle (84) and activated by a movable block (85) integral with the frame (11) of the device (10).

8. The device according to claim 1, wherein each of the individual supports consists of a swing tray (18) comprising a hook support (19) attached to the conveyer (15) and a suspension arm (20) attached at one end to the hook support and comprising at its other end the pivoting tray (21) which is attached in such a way that while objects are being transported, the pivoting tray inclines toward the front.

9. The device according to claim 8, wherein the suspension arm (20) is angled in relation to the vertical.

10. The device according to claim 9, wherein the angle of the suspension arm (20) of the swing tray (18) is such that the center of gravity of the pivoting tray (21) is located essentially on the vertical of the suspension point of the arm (20) on the hook support (19).

11. The device according to claim 1, wherein the individual supports consists of a pivoting tray (60) attached directly to the conveyor belt (15).

12. The device according to claim 8, wherein the pivoting tray (21, 60) comprises a surface for receiving objects that is defined in the front by a rectangular vertical rim (21*a*) and on each lateral side by a triangular vertical rim (21*b*), with the rear rim (21*c*) of the tray being open.

13. The device according to claim 12, wherein the receiving surface of the pivoting tray (21; 60) has perforations (56).

14. The device according to claim 12, wherein the pivoting tray (21) comprises a moving belt (90) located on the surface which receives objects, the belt being driven to move in a loop by two rollers (91, 92) respectively disposed parallel to and near the front rim (21*a*) and the rear rim (21*c*) of the tray.

15. The device according to claim 14, wherein the roller (91) located at the front of the tray (21) comprises a mechanism for driving it in rotation when the pivoting tray pivots toward the rear and for activating movement of the conveyor belt (90).

16. The device according to claim 2, wherein the drive mechanism for the front roller (91) comprises a friction drive wheel (93) attached to the rotational axis of the roller and cooperating with a rail parallel to the guide rail (8) for the individual supports when the pivoting tray (21) pivots.

17. The device according to claim 15, wherein when objects are being discharged, the moving belt (90) moves in the direction opposite to the direction in which the pivoting tray (21) is displaced.

18. The device according to claim 1, wherein the speed of the acceleration belt (32*b*; 50*b*) for the loading mechanism is higher than the displacement speed of the individual supports for the transporting mechanism.

19. The device according to claim 1, wherein when the objects are transferred from the loading mechanism onto the transporting mechanism, the automatic insertion belt (32*c*; 50*c*) is located within the extension of the pivoting tray (21) while the objects are deposited and it overlaps the rear rim (21*c*) of the tray while the objects are being transferred.

20. The device according to claim 1, wherein the loading mechanism comprises a manual insertion belt (32*a*; 50*a*) located upstream of the acceleration belt.

21. The device according to claim 1, wherein at least one window (34) of the storage and unloading buffer system (33) comprises two movable armatures (38) holding at one end the free extremity of a retractable lateral curtain (37), the armatures being connected with two activators (39), and the other extremity of the retractable lateral curtain being connected with a spring roller (40).

22. The device according to claim 21, wherein the activators (39) are pneumatic cylinders.

* * * * *